US005137256A

United States Patent [19]

Zipprath

[11] Patent Number: 5,137,256

[45] Date of Patent: Aug. 11, 1992

[54] CONTROL DEVICE FOR A FUEL INJECTION NOZZLE

[75] Inventor: Michael Zipprath, Herzogenaurach, Fed. Rep. of Germany

[73] Assignee: INA Walzlager Schaeffler KG, Fed. Rep. of Germany

[21] Appl. No.: 810,724

[22] Filed: Dec. 18, 1991

Related U.S. Application Data

[63] Continuation of Ser. No. 357,369, May 25, 1989, abandoned.

[30] Foreign Application Priority Data

Jul. 20, 1988 [DE] Fed. Rep. of Germany ....... 3824644

[51] Int. Cl.[5] ......................... F16K 1/32; F16K 31/02

[52] U.S. Cl. ................................ 251/129.02; 251/325

[58] Field of Search ........................... 251/325, 129.02; 239/585

[56] References Cited

U.S. PATENT DOCUMENTS 2,633,857 4/1953 MacDonald .................... 251/118 X

*Primary Examiner*—Arnold Rosenthal

*Attorney, Agent, or Firm*—Bierman and Muserlian

[57] ABSTRACT

A control device for a fuel injection nozzle of an internal combustion engine, particularly a diesel engine, provided with a movably guided valve body which forms a valve seat and is controlled by a driving unit and provided with an inner space and with a pressure chamber between an inlet and the valve seat whereby an injection pressure for the injection nozzle is built up in the pressure chamber when the valve seat is closed and pressure compensation is effected between the pressure chamber and an outlet when the valve seat is open characterized in that the valve seat is formed by the end of the valve body lying near the inlet, the pressure chamber communicates with the inner space of the valve body through the valve seat when this is open and the inner space communicates with the outlet.

2 Claims, 1 Drawing Sheet

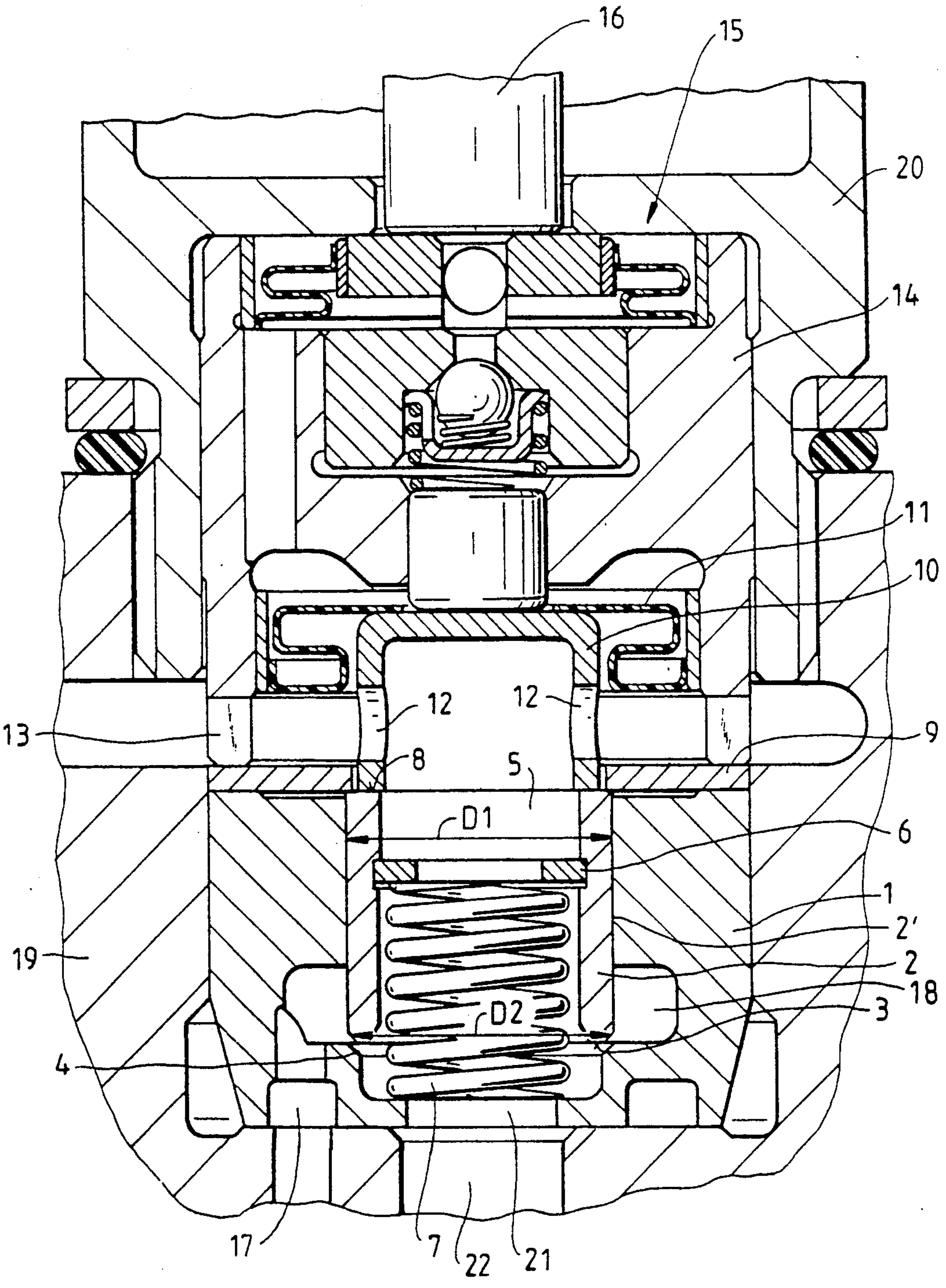
16
15
20
14
11
10
12
12
13
9
8
5
D1
6
1
2'
19
2
18
D2
3
4
17
7
22
21

CONTROL DEVICE FOR A FUEL INJECTION NOZZLE

PRIOR APPLICATION

This application is a continuation of U.S. patent application Ser. No. 357,369 filed May 25, 1989, now abandoned.

STATE OF THE ART

A control device for a fuel injection nozzle of an internal combustion engine, particularly a diesel engine, provided with a movably guided valve body which forms a valve seat and is controlled by a driving unit and provided with an inner space and with a pressure chamber between an inlet and the valve seat whereby an injection pressure for the injection nozzle is built up in the pressure chamber when the valve seat is closed and pressure compensation is effected between the pressure chamber and an outlet when the valve seat is open is described in German Patent Application No. P 37 04 743. The driving unit emits, for example electronically controlled, a force-path impulse which closes the valve seat located in a fuel-return pipe. As a result of the closing of the valve seat, a desired, high injection pressure is built up at the injection nozzle of the respective cylinder of the internal combustion engine.

In German Patent Application No. P 37 04 743, the valve seat is provided at the end of the valve body lying near the outlet and the volume of the pressure chamber is accordingly large. However, a large-volume pressure chamber has the disadvantage that a correspondingly large volume of fuel has to be put under pressure when the valve seat is closed. Moreover, when the valve seat is opened the fuel has to flow off on the outside of the valve body and this is accompanied by a comparatively high flow resistance which delays pressure compensation.

OBJECTS OF THE INVENTION

It is an object of the invention to improve the prior art control device so that both the pressure build-up when the valve seat is closed and the pressure compensation when the valve seat is open can take place rapidly.

This and other objects and advantages of the invention will become obvious from the following detailed description.

THE INVENTION

The control device of the invention for a fuel injection nozzle of an internal combustion engine, particularly a diesel engine, provided with a movably guided valve body which forms a valve seat and is controlled by a driving unit and provided with an inner space and with a pressure chamber between an inlet and the valve seat whereby an injection pressure for the injection nozzle is built up in the pressure chamber when the valve seat is closed and pressure compensation is effected between the pressure chamber and an outlet when the valve seat is open is characterized in that the valve seat is formed by the end of the valve body lying near the inlet, the pressure chamber communicates with the inner space of the valve body through the valve seat when this is open and the inner space communicates with the outlet.

This makes the volume of the pressure chamber which lies between the inlet and the valve seat relatively small. According, to open the injection nozzle, only a small volume of fuel has to be put under pressure and this accelerates the pressure build-up. When the valve seat is opened, the pressure chamber communicates with the comparatively large-volume inner space of the valve body and the flow resistance during pressure compensation is low, thus enabling rapid pressure compensation.

A further advantage is that the valve body has a relatively small moving mass and is tubular in shape and does not need an outer region for draining off the fuel during pressure compensation. On the whole, the control characteristic of the control device is improved by the described means. In a preferred embodiment of the invention, the valve seat diameter at the valve body is smaller than its guide diameter. The result of this is that the pressure of the pressure chamber aids the opening of the valve seat.

Referring now to the drawing

In the FIGURE a tubular valve body (2) is movably mounted in a valve housing (1) and the guiding diameter of the valve body (2) in the valve housing (1) is designated as D1. A valve seat (4) is formed between one front edge (3) of the valve body (2) and the valve housing (1). The valve seat diameter is designated as D2 and this is slightly smaller than the guiding diameter D1. The valve body (2) forms an inner space (5) and on the inside of the valve body (2), a snap ring (6) is provided which stays a pressure spring (7). In the FIGURE, the valve seat (4) is shown in its open position and in this position, the pressure spring (7) pushes, via the snap ring (6), the front edge (8) of the valve body (2) lying opposite the front edge (3) against a stop ring (9).

A bucket member (10) connected with a diaphragm (11) rests on the front edge (8) and the bucket member (10) is provided with openings (12) leading to an outlet (13). The inner space (5) thus communicates with the outlet (13). In an upper part (14) of the valve body (1), a clearance compensation element (15) is arranged with one end resting against the bucket member (10) and the other end being acted upon by a driving unit (16).

In the valve body (2), an inlet (17) is provided and between this and the valve seat (4), an annular pressure chamber (18) is provided. The valve housing (1) is inserted into a mounting body (19) in which it is held by means of a threaded sleeve (20). The outlet (13) continues into the mounting body (19). In the valve body (2), another outlet (21) is provided from the inner space (5) which outlet (21) is associated with a corresponding opening (22) in the mounting body (19). As a rule, the mounting body (19) is designed so that only one of the two outlets (13, 21) is operational.

The outlet (13 or 21 respectively) is connected with the low pressure side of an injection pump not shown in the drawing. On the high pressure side of the injection pump are located an injection nozzle not shown in the drawing and the inlet (17).

Starting from the phase represented in the FIGURE, the method of operation of the described device is as follows: Fuel is conveyed by the injection pump through the inlet (17), the pressure chamber (18), the valve seat (4), the inner space (5) and one of the outlets (13 or 21), whichever is connected. During this time, no pressure is built up in the pressure chamber (18) so that the injection nozzle remains closed. The pressure spring (7) keeps the valve seat (4) open. If now the driving unit (16) is actuated, for example electronically. it presses the bucket member (10) via the clearance compensation element (15) against the valve body (2) so that the valve seat (4) is closed against the pressure of the pressure spring (7). In the pressure chamber (18), a high pressure develops, say 1000 bars, which opens the injection nozzle.

Since the valve seat diameter (D2) and the guiding diameter (D1) are essentially equal, the closing force required to be exerted on the valve seat (4) is relatively small. As long as the valve body (2) is held in the closed position, there is a compulsory flow of fuel from the pressure chamber (18) along the outer surface (2') of the valve body (2) into the outlet (13). However, the closed position is maintained during this time. When the driving unit (16) is switched off, the valve body (2) is displaced by the action of the pressure spring (7). The opening action is aided by the fact that the valve seat diameter (D2) is slightly smaller than the guiding diameter (D1). When the valve seat (4) is opened, the pressure level in the pressure chamber (18) is rapidly reduced with the help of the inner space (5).

Various modifications of the control device of the invention may be made without departing from the spirit or scope thereof and it is to be understood that the invention is intended to be limited only as defined in the appended claims.

What I claim is:

1. A control device for a fuel injection nozzle of an internal combustion engine, particularly a diesel engine, provided with a tubular valve body (2) displaceably guided on a guide diameter (D1) in a valve housing (1) and controlled by a driving unit (16), which valve body (2) can be made to bear by one front edge (3) against a valve seat (4) provided on inner wall of the valve housing (1) and comprises an inner space (5), the fuel injection nozzle being further provided with a fuel pressure chamber (18) which is located within the valve housing (1) between a fuel inlet (17) and the valve seat (4), this latter being situated opposite the end of the valve body (2) lying near the inlet (17), and an injection pressure for the injection nozzle being built up in the pressure chamber (18) when the valve is closed and pressure compensation between the pressure chamber (18) and a fuel outlet (13) being effected when the valve is open, the pressure chamber (18) being in communication with the outlet (13) via the valve seat (4), characterized in that a stop ring (9) is associated with a front edge (8) of the tubular valve body (2) facing away from the valve seat (4), a bucket member (10) for driving the valve body (2) is disposed on said front edge (8) of the tubular valve body (2) facing away from the valve seat (4) and comprises openings (12) by which the inner space (5) of the valve body (2) communicates with the outlet (13), a snap ring (6) being arranged at the valve body (2), against which snap ring (6) a pressure spring (7) bears.

2. A control device of claim 1 wherein the valve seat diameter (D2) at the valve body (2) is smaller than the guide diameter (D1) of the valve body (2).

* * * * *